United States Patent

Hamabe

Patent Number: 6,070,084
Date of Patent: May 30, 2000

[54] CELLULAR SYSTEM

[75] Inventor: Kojiro Hamabe, Tokyo, Japan

[73] Assignee: NEC Corporation, Tokyo, Japan

[21] Appl. No.: 08/819,914

[22] Filed: Mar. 18, 1997

[30] Foreign Application Priority Data

Mar. 18, 1996 [JP] Japan .................................. 8-088805

[51] Int. Cl.⁷ .................................................. H04Q 7/20
[52] U.S. Cl. ............................ 455/522; 455/69; 455/436
[58] Field of Search ................................. 455/68, 69, 88,
455/422, 436, 442, 517, 522; 370/317,
318, 320

[56] References Cited

U.S. PATENT DOCUMENTS

| | | |
|---|---|---|
| 5,056,109 | 10/1991 | Gilhousen et al. . |
| 5,101,109 | 3/1992 | Gilhousen et al. . |
| 5,386,589 | 1/1995 | Kanai ........................................ 455/88 |
| 5,485,486 | 1/1996 | Gilhousen et al. ...................... 455/522 |
| 5,487,174 | 1/1996 | Persson .................................... 455/522 |
| 5,491,717 | 2/1996 | Hall ......................................... 455/522 |
| 5,574,983 | 11/1996 | Douzono et al. ........................ 455/522 |

OTHER PUBLICATIONS

TIA/EIA Interim Standard, "Mobile Station–Base Station Compatibility Standard for Dual–Mode Wideband Spread Spectrum Cellular System" and TIA/EIA/95–A, Telecommunications Industry Association, May 1995, "6.6.6.2.7.2 Reverse Traffic Channel Power Control during Soft Handoff".

Primary Examiner—Dwayne D. Bost
Assistant Examiner—Nay Maung
Attorney, Agent, or Firm—Scully, Scott Murphy & Presser

[57] ABSTRACT

When a base station receives a frame error rate from a mobile station (step 202) and finds that the rate is higher than a predetermined rate range (step 203), they increase transmission power level Pf by ΔP (step 204). When the frame error rate is lower than the predetermined rate range (step 205), the base station reduces the transmission power level Pf by ΔP (step 206). When the base station finds that the result D of measurement of the desired wave power level is higher than a predetermined desired control level T (step 207), it provides a level reduction command as transmission power level control command (step 208), and sets (Pf+Padd) as the transmission power level P (step 209). The base station sends the control command to the mobile station. When the desired wave power level measurement result D is lower than the desired control level T (step 207), it provides a level increase command as the control command (step 210). Then, it sets the transmission power level P to be Pf, and sends the control command to the mobile station (step 212).

9 Claims, 8 Drawing Sheets

CELLULAR SYSTEM

BACKGROUND OF THE INVENTION

The present invention relates to a cellular system, in which mobile stations communicate with one another via base stations located in respective service areas or cells. More particularly, the present invention concerns a method of transmission power control in a cellular system, which provides hand-over control permitting continuous communication of a mobile station and also transmission power control when the mobile station is moving between two base stations.

Some CDMA (code division multiplexed access cellular system) adopts a technique called soft hand-over system, inter-cell lines are switched when a mobile station moving between cells approaches the borderline between the cells, while continuing simultaneous communications with a plurality of base stations. This technique is detailed in U.S. Pat. No. 5,101,501 (Gilhousen et al., "Method and System for Providing a Soft Handoff in Communications in a CDMA Cellular Telephone System", Mar. 31, 1992).

In the CDMA system, the same frequency is used by a plurality of lines, and the reception power (or desired wave power) of a signal on a certain line constitutes interference wave power to other lines. Therefore, in an up line, via which the signal is transmitted by a mobile station and received by a base station, increase of the desired wave power beyond a predetermined level results in an interference power increase, thus reducing the line capacity. To prevent this, the transmission power on the up line of the mobile station should be stringently controlled, In such an up line transmission power control, the base station measures the desired wave power and, when the desired wave power is high, it sends out an up line transmission power reduction control command to the mobile station, while sending out an up line transmission power increase control command to the mobile station when the desired wave power is low. This method of transmission power control is detailed in U.S. Pat. No. 5,056,109 (Gilhousen et al, "Method and Apparatus for Controlling Transmission Power in a CDMA Cellular Mobile Telephone System", Oct. 8, 1991).

In up line transmission power control during execution of the soft handover, a plurality of base stations measure the desired wave power from a mobile station, and send independent up line transmission power control commands to the mobile station. When the mobile station receives different control commands, it preferentially follows a transmission power reduction control command. This method is described in TIA/EIA Interim Standard, "Mobile Station-Base Station Compatibility Standard for Dual-Mode Wideband Spread Spectrum Cellular System" and TIA/EIA/95-A, Telecommunications Industry Association, May 1995, "6.6.6.2.7.2 Reverse Traffic Channel Power Control during Soft Handoff". As shown, when control commands from base stations are different, a transmission power reduction control command is preferentially followed, thus preventing the surpassing of a desired value of control by the desired wave power in any base station and realizing high line capacity of the up line. In this method, it is important to reduce the probability of failure of the transmission power reduction control signal reception by the mobile station.

In the down line, via which the signal is transmitted from the base station and received by the mobile station, a high line capacity is realized by transmission power control such that the ratio between the desired wave power and the interference wave power is a predetermined value. In the up line transmission power control, an up line transmission power control command is transmitted to the mobile station to the mobile station by utilizing the down line as described before, and during the soft handover execution the down line transmission power should be controlled such that the mobile station can receive up line transmission power control commands sent out from a plurality of base stations.

A conceivable method to this end is to control the down line transmission power such that the desired power levels from the base stations are equal at the mobile station. In this method, base stations with higher transmission losses up to the mobile station set correspondingly increased transmission power. Increasing the transmission power, however, increases the interference wave power and reduces the down line capacity. The down line capacity reduction can be suppressed by controlling the transmission power levels of the base stations to be equal. This method is described in Anderson, "Tuning the Micro Diversity Performance in a DS-CDMA System", Proc. IEEE 44th Vehicular Technology Conference, pp. 41–45, June 1994.

In the above prior art transmission power control method, however, the desired wave power sent from a base station with a high transmission loss to the mobile station is low. In this case, the probability of failure of the up line transmission power control command from the base station and also the probability of failure of the up line transmission power reduction control command by the mobile station are increased.

Instantaneous transmission loss variations vary with the frequency. In a cellular system in which different frequencies are used for the up and down lines, therefore, the transmission losses in the up and down lines are different. As a result, due to the low up line transmission loss when the transmission power reduction control command is sent with the desired control value at the base station, a case may arise that due to a high transmission loss in the down line the desired wave power in the mobile station is low, resulting in a failure of the transmission power reduction control command by the mobile station.

When the control commands from all the other base stations are transmission power increase control commands at this time, the mobile station increases the transmission power. In consequence, the desired wave power becomes excessive in the base station, resulting in increase of the interference wave power and reduction of the up line capacity of that base station compared to the case when the transmission control power is executed without control command reception failure. In such a transmission power control method, in which the reception power levels from the base stations are made equal, the probability of receiving all up line transmission power control commands is reduced, giving rise to a problem of reducing the up line capacity.

SUMMARY OF THE INVENTION

An object of the present invention is to provide a transmission power control method, which can solve the above problems in the cellular systems and control the up line transmission power with increase of the up line capacity.

According to one aspect of the present invention, there is provided a cellular system involving a plurality of cells, base stations each located in each of the cells, and a plurality of mobile stations present in the cells, the mobile stations each being able to have a line or lines set for communication with one or a plurality of the base stations, wherein: when one of the mobile stations have lines set with respect to a plurality of the base stations, the plurality of base stations each measure the received power level of signal transmitted from a mobile station, determine a control command for controlling the transmission power level of signal transmitted by the mobile station, and send the control command to the mobile station, and the mobile station receives the control commands from the plurality of base stations and controls the transmission power level according to a control command for making the transmission power level minimum, and when one of the base stations send a control command for reducing the transmission power level to the mobile stations, the transmission power level of signal sent by the base station is increased with respect to the other cases.

The base stations each send a pilot signal, one of the mobile stations with lines set with respect to a plurality of the base stations measures the received power levels of the pilot signals of the plurality of base stations and reports all the received power levels of the pilot signals to all of plurality of base stations, and when each of the base stations send a control command for reducing the transmission power level and the received power level of the own pilot signal is not highest among the received power levels of the pilot signals of the plurality of base stations, the transmission power level sent by the base station is increased with respect to the other cases.

The base stations each send a pilot signal, one of the mobile stations with lines set with respect to a plurality of the base stations with lines set with respect to a plurality of the base stations measures the received power levels of the pilot signals of the plurality of base stations and reports all the received power levels of the pilot signals to the plurality of the base stations, and when each of the base stations send a control command for reducing the transmission power level and the received power level of the own pilot signal is not highest among the received power levels of the pilot signals of the plurality of base stations, the transmission power level sent by the base station is increased by an amount corresponding to the ratio between the highest received power level one of the pilot signals of the plurality of base stations and the received power level of the own pilot signal.

According to another aspect of the present invention, there is provided a cellular system involving a plurality of cells, base stations each located in each of the cells, a switching station connected to the base stations, and mobile stations present in the cells, the mobile stations being able to have a line or lines set for communication with one or a plurality of the base stations, a transmission power level control method, wherein: when one of the mobile stations has lines set with respect to a plurality of the base stations, the plurality of base stations each measure the received power level of signal transmission from the base station, the switching station determines a control command for controlling the transmission power level of signal transmitted by the mobile station, and the plurality of base stations send the determined control signal to the mobile station, and the mobile station receives the control command and controls the transmission power level on the basis of the received control command.

When the switching station determines the control signal for controlling the transmission power level of signal transmitted by the mobile station on the basis of the measurement result in the plurality of base stations, the base stations each tentatively determine a control command for controlling the transmission power level of signal transmitted by the mobile station, and the switching station determines one of the control commands tentatively determined by the plurality of base stations that minimizes the transmission power level of signal transmitted by the mobile station.

The base stations each send a pilot signal, while one of the mobile stations have lines set with respect to a plurality of the base stations, the mobile station measures the received power levels of the pilot signals of the plurality of base stations and reports all the received power levels to the plurality of base stations, and the base station sending the highest received power level pilot signal sends the determined control signal to the mobile station.

Other objects and features will be clarified from the following description with reference to attached drawings.

PREFERRED EMBODIMENTS OF THE INVENTION

Figure 1:
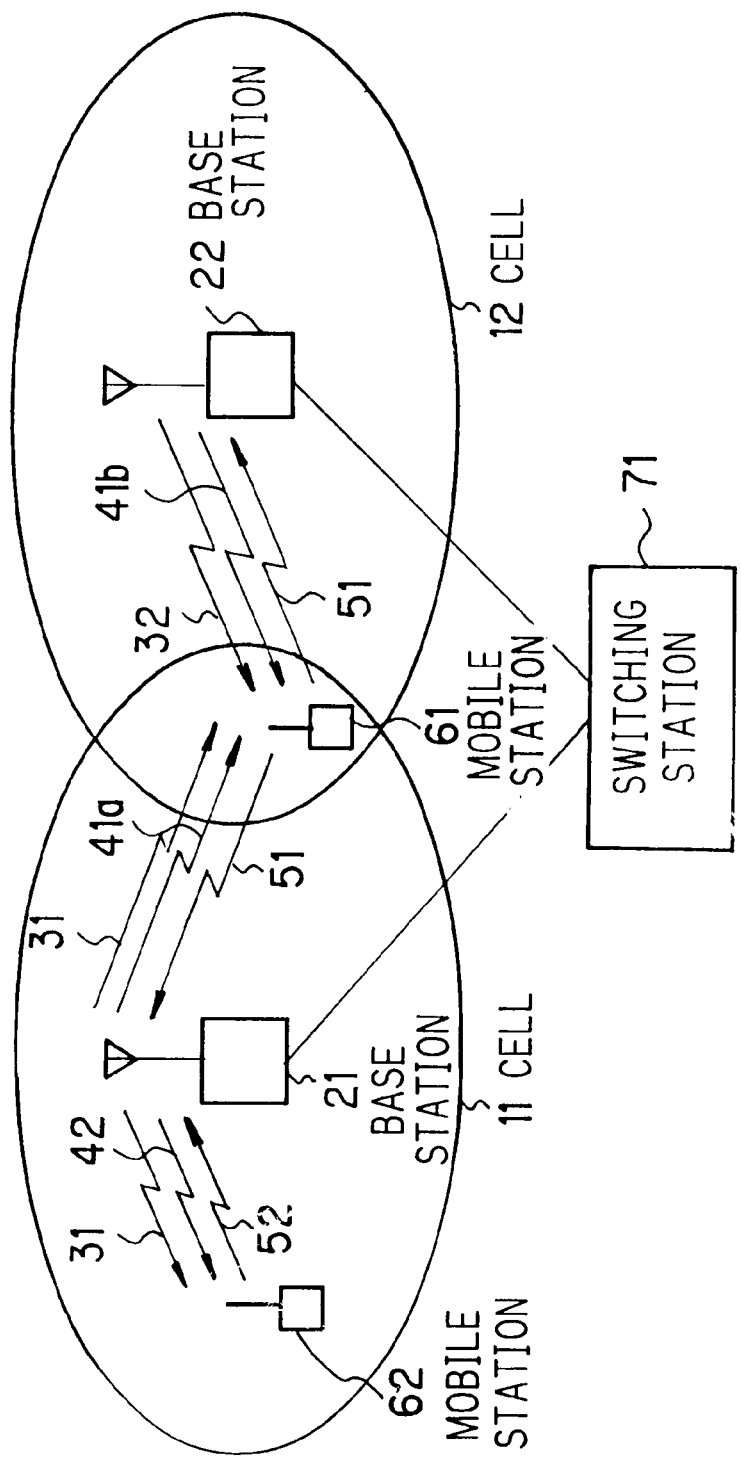
FIG. 1 is a schematic view showing a cellular system which adopts a first embodiment of the transmission power control method according to the present invention.

FIG. 1 is a schematic view showing a cellular system which adopts a first embodiment of the transmission power control method according to the present invention. In this cellular system, the service area consists of a plurality of divisions or cells 11, 12, ... with respective base stations 21, 22, ... located therein. Mobile stations 61, 62, ... are present in these cells. The base stations 21, 22 are connected to a switching station 71, which is in turn connected to the rest of a network with the other switching stations (not shown). Although not shown, it is assumed that this cellular system includes many other base stations and that many mobile stations are present in each cell.

Figure 8:
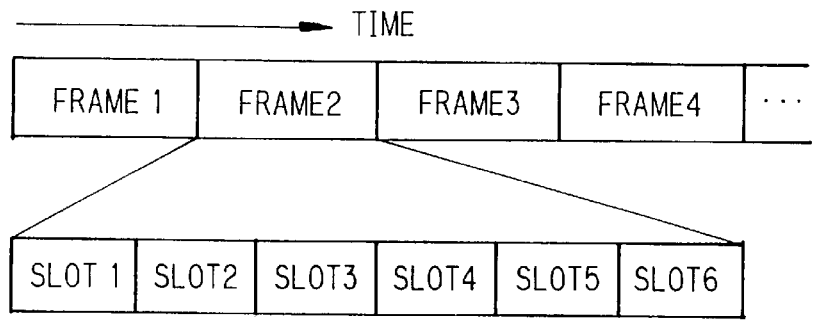
FIG. 8 is an example of frame structure for measuring the pilot signal received power by the mobile station in the cellar system in FIG. 1.

The base stations 21, 22, . . . transmit their respective pilot signals 31, 32 . . . . The mobile stations 61, 62, . . . measure the received power levels Q of the pilot signals 31, 32, . . . with their received power level measuring units. The received power level measuring units of the mobile stations 61, 62, . . . measure pilot signals 31, 32, . . . from a plurality of base stations 21, 22, . . . on a time division basis in each frame, each pilot signal in each short unit slot as shown in FIG. 8. In the case of FIG. 8, each frame consists of six slots, and at most six pilot signals can be measured in each frame.

Figure 9:
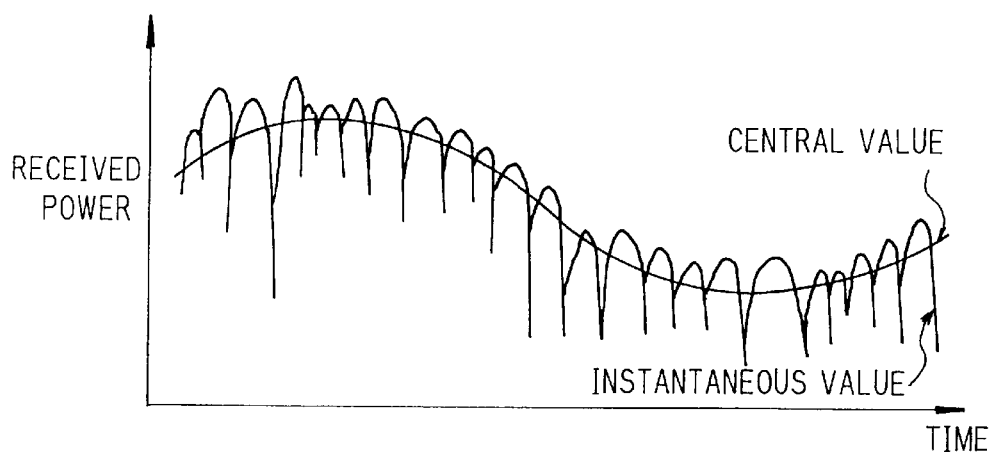
FIG. 9 is a drawing for explaining the instantaneous value and the center value of the received power.

When the mobile stations 61, 62, . . . are moving, the received power level Q of each pilot signal is instantaneously varied in a short cycle with the lapse of the time, as shown in FIG. 9. Accordingly, the mobile stations 61, 62, . . . make measurement of the received power levels Q of the pilot signals for frames corresponding in number to a time, which is sufficiently long compared to the instantaneous variation cycle time of the received power levels Q of the pilot signals when the mobile stations 61, 62, . . . are moving, and obtain the center values of the measurements in the slots.

When a mobile station commences communication, it sets a line between it and a base station, the pilot signal from which has the highest received power level center value (hereinafter referred to as primary base station). When a base station is present, the pilot signal from which has a received power level center value higher than the received power level center value of the primary base station pilot signal by a predetermined handover threshold value (hereinafter referred to as secondary base station), the mobile station also sets a line for communication between it and the secondary base station. During communication, the received power levels Q of pilot signals may be varied with the movement of the mobile stations 61, 62, . . . . The primary and secondary base stations are changed when the base station with the highest received power level center value pilot station is changed, when the secondary base station is no longer qualified as such, and when a different base station has become qualified as the secondary base station.

When the mobile station 61 finds that the pilot signal 31, for instance, has the highest received power level Q and that the difference between the received power levels Q of the pilot signals 32 and 31 is within the handover threshold value, its primary and secondary base stations are constituted by the base stations 21 and 22, respectively. The base stations 21 and 22 transmit down line signals 41a and 41b to the mobile station 61, and the mobile station 61 transmits an up line signal 51 to the base stations 21 and 22.

On the other hand, when the mobile station 62 finds that the pilot signal 31 has the highest received power level Q, the base station 21 constitutes the primary base station. In this case, the difference between the received power levels Q of the pilot signals 32 and 31 surpasses the handover threshold value, and no secondary base station of the mobile station 22 is present. At this time, the mobile station 62 makes communication with the base station 21 with the up and down line signals 42 and 52.

In this cellular system, the base stations 21, 22, . . . and mobile stations 61, 62, . . . transmit data in distinct frames each with a constant amount of data by providing an error detection code in each frame.

The base stations 21 and 22 each has a power level measuring instrument (not shown) for measuring the corresponding desired wave power level, and they measure desired wave power levels whenever they receive frames transmitted by the mobile stations 61 and 62.

The mobile stations 61 and 62 each have frame error rate measuring unit (not shown). Whenever the mobile stations 61 and 62 receive frames transmitted from the base stations 21 and 22, they detect errors in frame data codes using error detection codes, and whenever they receive a predetermined number of frames they calculate the rate of frames containing errors (frame error rate).

The base stations 21 and 22 as the primary and secondary base stations of the mobile station 61 executing the soft handover, send out down line signals 41a and 41b, which are the same data except for up line transmission power level control command, to the mobile station 61. The mobile station 61 each have a synthesizer (not shown) for synthesizing the same signals transmitted from a plurality of base stations 61, 62, . . . , and synthesize the received down line signals 41a and 41b using the synthesizer. The frame error rate measuring unit calculates the frame error rate from the synthesized received signal. The mobile station 61 reports the frame error rate obtained from the frame error rate measuring unit to the base stations 21 and 22. Likewise, the mobile station 62 reports the frame error rate to the base station 21.

The flow chart will now be explained. In the flow chart, the power level is in decibels.

Figure 2:
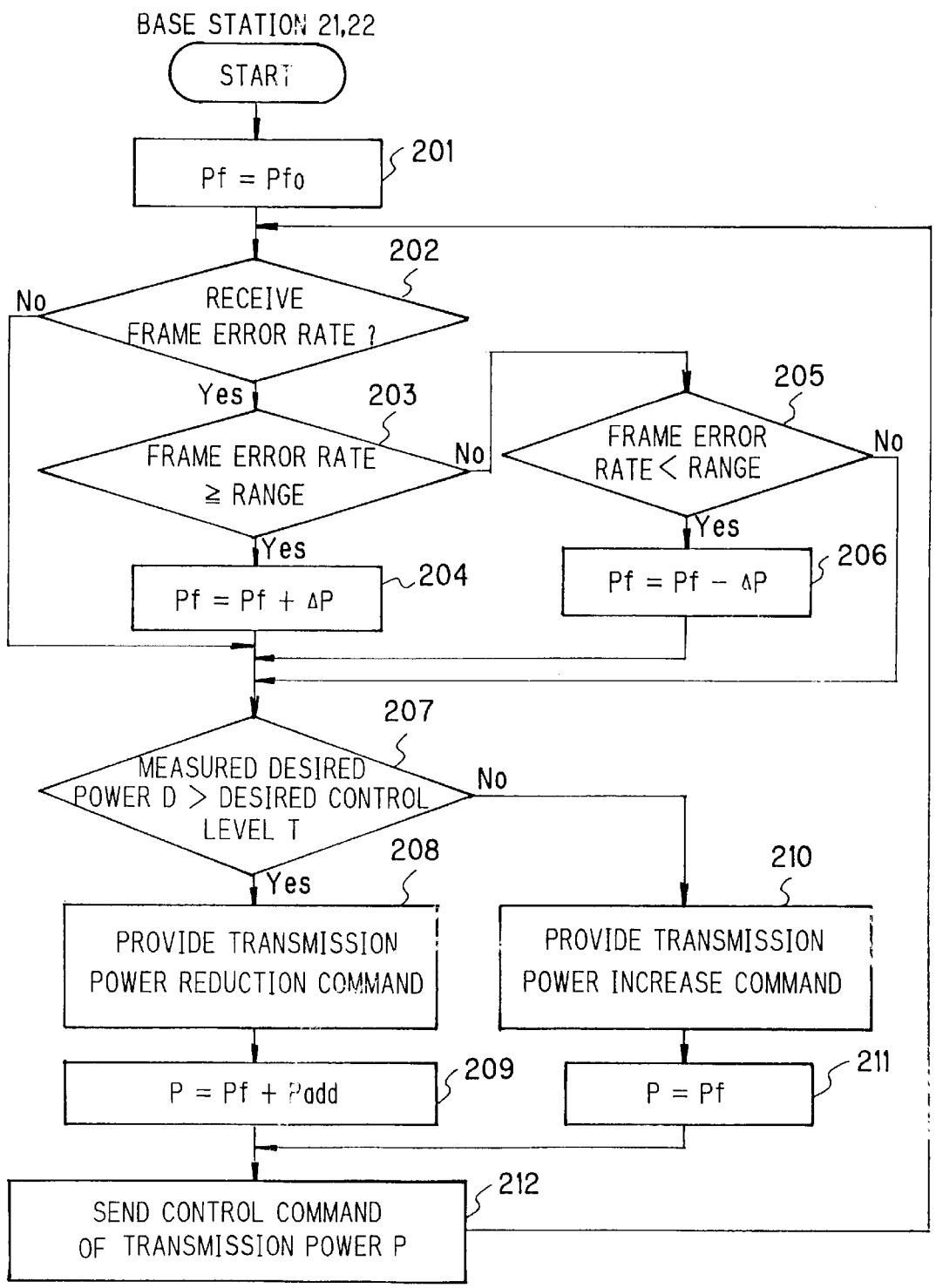
FIG. 2 is a flow chart illustrating a process executed by a base station for determining a down line transmission power level by receiving the frame error rate report from a mobile station and sending out an up line transmission power level control command.

FIG. 2 is a flow chart illustrating a process executed by a base station for determining a down line transmission power level by receiving the frame error rate report from a mobile station and sending out an up line transmission power level control command. Referring to FIG. 2, this up line transmission power level control command sending process comprises a transmission power level initializing step 201, a frame error rate reception judging step 202, an over predetermined level judging step 203, a transmission power level increasing step 204, an under predetermined level judging step 205, a transmission power level reducing step 206, an over desired power measured result control level judging step 207, a transmission power level reduction control command setting step 208, a transmission power level increase setting step 209, a transmission power level increase control command setting step 210, a transmission power level increase setting step 209, a transmission power level increase control command setting step 210, a transmission power level setting step 211, and a control command sending step 212.

The above first embodiment of the transmission power level control method will now be described along with the operation of the cellular system.

When the base stations 21 and 22 start communication with the mobile stations 61 and 62, they set the down line transmission power level Pf that is determined by the frame error rate to an initial level $Pf_0$ (step 201). The frame error rate is reported at a predetermined interval from the mobile stations 61 and 62. When the base stations 21 and 22 receive a newly reported frame error rate (step 202) and find that the rate is higher than a predetermined level range (step 203), the base stations 21 and 22 increase the down line transmission power level Pf determined by the frame error rate by $\Delta P$ (>0) (step 204). When the frame error rate is lower than the predetermined rate range (step 205), the base stations 21 and 22 reduce the down line transmission power level Pf determined by the frame error rate by $\Delta P$ (step 206). When it is found in the step 202 that no newly reported frame error rate is present, the base stations 21 and 22 executes a step 207 without changing the down line transmission power level Pf determined by the frame error rate.

When it is found in the step 207 that the result D of measurement of the up line desired wave power level that is measured for every frame is higher than a predetermined desired control level T, the base stations 21 and 22 provide a level reduction command as the up line transmission power level control command (step 208), and set (Pf+Padd) as the down line transmission power level P (step 209). In this embodiment, the transmission power level increase Padd is set to a predetermined value.

When the result D of measurement of the up line desired wave power level is lower than the predetermined desired control level T, the base stations 21 and 22 provide the level increase command as the up line transmission power level control command (step 210), and sets the down line transmission power level P to the level Pf determined by the frame error rate (step 211). Then, the base stations 21 and 22 send an up line transmission power level control command at the down line transmission power level P to the mobile stations 61 and 62 (step 212), and then repeat the routine from the step 202.

The mobile station 62 controls the up line transmission power level according to the up line transmission power level control command sent out by the base station 21. The mobile station 61 on the other hand, which have lines set with respect to the two base stations 21 and 22 at a time, receives the up line transmission power level control commands sent by these base stations 21 and 22. When the two control commands received are different in the content, the mobile station 61 controls the up line transmission power level according to its up line transmission power level reduction control command.

In the first embodiment of the transmission power level control method, during the soft handover execution the primary and secondary base stations receive the same frame error rate report and do the same control of the down line transmission power level Pf determined by the frame error rate. Thus, the base stations 21 and 22 provide an equal down line transmission power level Pf determined by the frame error rate. When sending an up line transmission power level reduction control command to the mobile stations 61 and 62, the down line transmission power level P is set to be higher than the down line transmission power level Pf determined by the frame error rate by the transmission power level increase Padd. It is thus possible to reduce the probability that the mobile stations 61 and 62 fail to receive the up line transmission power level reduction control command, resulting in excessive influence of the up lines on other lines.

A second embodiment of the transmission power level control method will now be described.

The cellular system adopting the second embodiment of the transmission power level control method, has the same construction as the cellular system adopting the first embodiment of the transmission power level control method. The sole differences reside in a flow part that the mobile stations 61 and 62 report the received power level Q of pilot signals during the communication to the base stations 21 and 22, and a flow part that the base stations 21 and 22 send the up line transmission power level control command by determining the down line transmission power level P.

The mobile station 61 measures the received power Q of the pilot signals 31 and 32 sent from the base stations 21 and 22 as the primary and secondary stations, and report the both measured power Q of the pilot signals.

The time that is spent for the measurement of the received power level Q of the pilot signal, is set to be shorter than the time spent for the measurement of the received power level center value of the pilot signal. The time interval of the report of the measurement result is set to be shorter than the time interval of updating the primary and secondary base stations. In this embodiment, the pilot signal measurement signal frame shown in FIG. 8 and the transmission/reception frame shown in FIG. 10 have the same length. The mobile stations 61 and 62 measure the received power levels Q of the pilot signals of the base stations 21 and 22 once in each frame shown in FIG. 8, and report the measurement result to the base stations 21 and 22 for each transmission/reception frame of them.

With this arrangement, the influence of instantaneous variations of the received power level Q of the pilot signal is substantially removed from the center value of the received power level Q of the pilot signal used for determining the primary and secondary base stations, but is present in the received power level Q of the pilot signal measured for each frame because of the short measurement time. Therefore, as for the received power level Q of the pilot signal for each frame, unlike the center value, the highest received power level Q may not be of the pilot signal of the primary base station.

Figure 3:
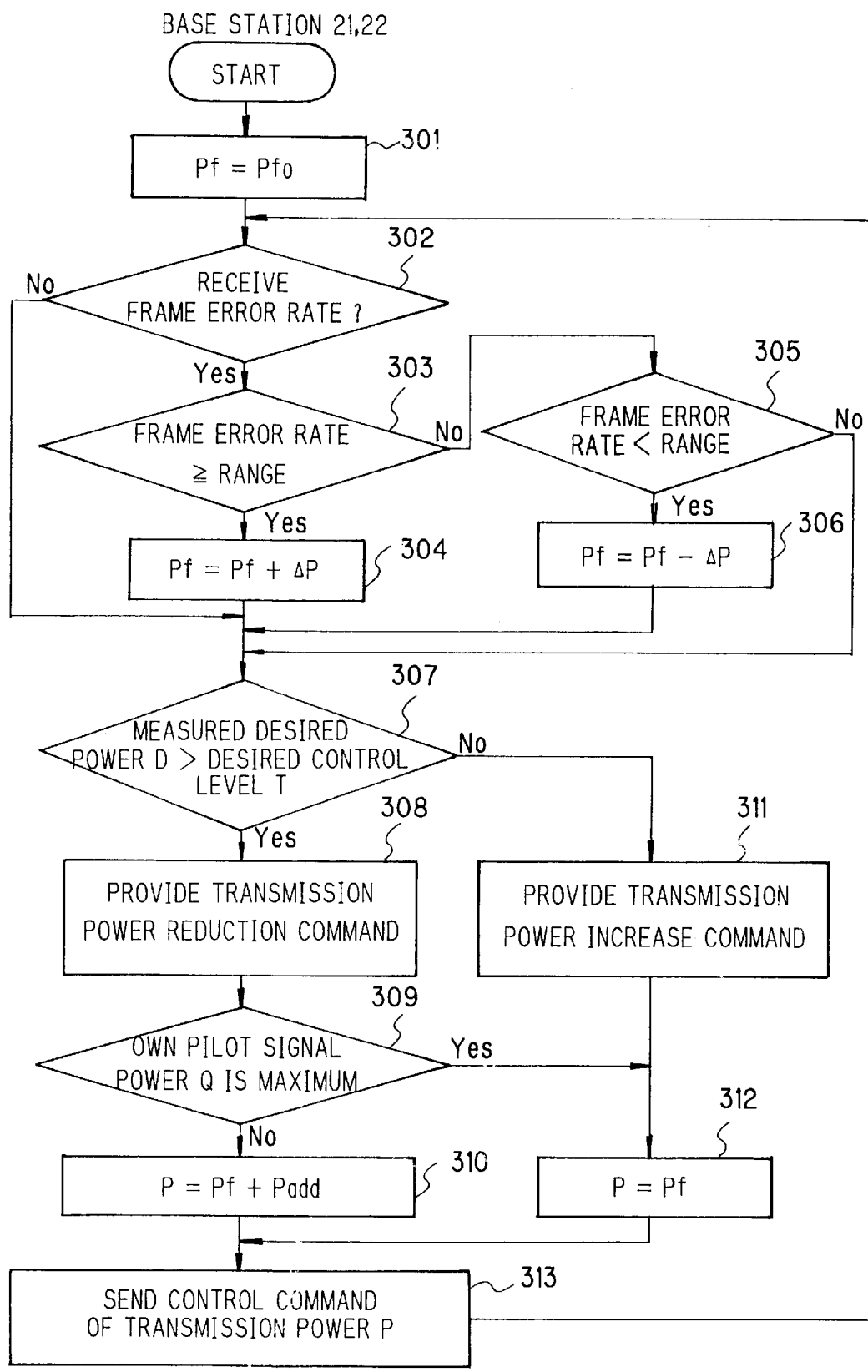
FIG. 3 is a flow chart illustrating a process, in which the base stations 21 and 22 determine the down line transmission power level P by receiving the report of the received power level Q of the pilot signal measured for each frame from the mobile stations 61 and 62 and send an up line transmission line power control command.

FIG. 3 is a flow chart illustrating a process, in which the base stations 21 and 22 determine the down line transmission power level P by receiving the report of the received power level Q of the pilot signal measured for each frame from the mobile stations 61 and 62 and send an up line transmission line power control command. Referring to FIG. 3, the up line transmission power level control command sending process comprises a transmission power level initializing step 301, a frame error rate reception judging step 302, an over rate range judging step 303, a transmission power level increasing step 304, an under predetermined level judging step 305, a transmission power level reducing step 306, an over desired control level judging step 307, a transmission power level reduction control level control command setting step 308, a maximum own pilot signal reception power level judging step 309, a transmission power level increase setting step 310, a transmission power level increase control command setting step 311, a transmission power level setting step 312, and a control command sending step 313.

The second embodiment of the transmission power level control method will now be described together with the operation of the cellular system.

When the base stations 21 and 22 start the communication with the mobile stations 61 and 62, they set the down line transmission power level Pf determined by the frame error rate to an initial value $Pf_0$ (step 301). The frame error rate is reported at a predetermined interval by the mobile stations 61 and 62. When the base stations 21 and 22 receive a newly reported frame error rate (step 302) and find that the rate is higher than a predetermined rate range (step 303), they increase the down line transmission power level PF determined by the frame error rate by ΔP (step 304). When the rate is lower than the predetermined rate range (step 305), the base stations 21 and 22 reduce the down line transmission power level Pf determined by the frame error rate by ΔP (step 306). When it is found in the step 302 that no newly reported frame error rate is present, the base stations 21 and 22 leave the down line transmission power level Pf determined by the frame error rate as such, and go to a step 307.

When it is determined in the step 307 that the measurement result D of the up line desired wave power level measured for very frame is higher than the desired control level T, the base stations 21 and 22 provide a level reduction command as the up line transmission power level control command (step 308). When it is found in a step 309 that the received power level Q of the own pilot signal is not maximum, the base stations 21 and 22 set (Pf+Padd) as the down line transmission power level (step 310). In this embodiment, the transmission power level increase Padd is set to a predetermined value. When it is found in the step 309 that the received power level Q of the own pilot signal is the highest level, the base stations 21 and 22 set the down line transmission power level P to the down line transmission power level Pf determined by the frame error rate (step 312).

When it is found in the step 307 the measurement result D of the up line desired wave power level is lower than the predetermined control level T, the base stations 21 and 22 provide a level increase command as the up line transmission power level control command (step 311), and set the down line transmission power level P to the down line transmission power level Pf determined by the frame error rate (step 312). The base stations 21 and 22 send the up line transmission power level control command at the down line transmission power level P to the mobile stations 61 and 62 (step 313), and repeat the routine from the step 302.

In the second embodiment of the transmission power level control method, when the base stations 21 and 22 send the up line transmission power level reduction control command to the mobile stations 61 and 62, they increase the down line transmission power level P by the transmission power level increase Padd when and only when otherwise it is highly probable that the mobile stations 61 and 62 fail to receive the up line transmission power level reduction control command because the received power level Q of the own pilot signal is not the highest level. As a result, it is possible to reduce the probability of excessive interference on the up line due to the failure in receipt of the up line transmission power level reduction control command of the mobile station 61, 62 and also to suppress the increase of interference power due to the increase in the down line transmission power P.

A third embodiment of the transmission power level control method will now be described.

The cellular system adopting the third embodiment of the transmission power level control method has the same construction as the cellular system adopting the second embodiment of the transmission level control method, and also the flow part, in which the base stations send the up line transmission power level control command by determining the down line transmission power level P as shown by the flow chart of FIG. 3. A difference resides in the way of determining the transmission power level increase Padd. Specifically, the transmission power level increase Padd is determined on the basis of the received power level Q of the pilot signal of the own station and that of the other base station.

Figure 4:
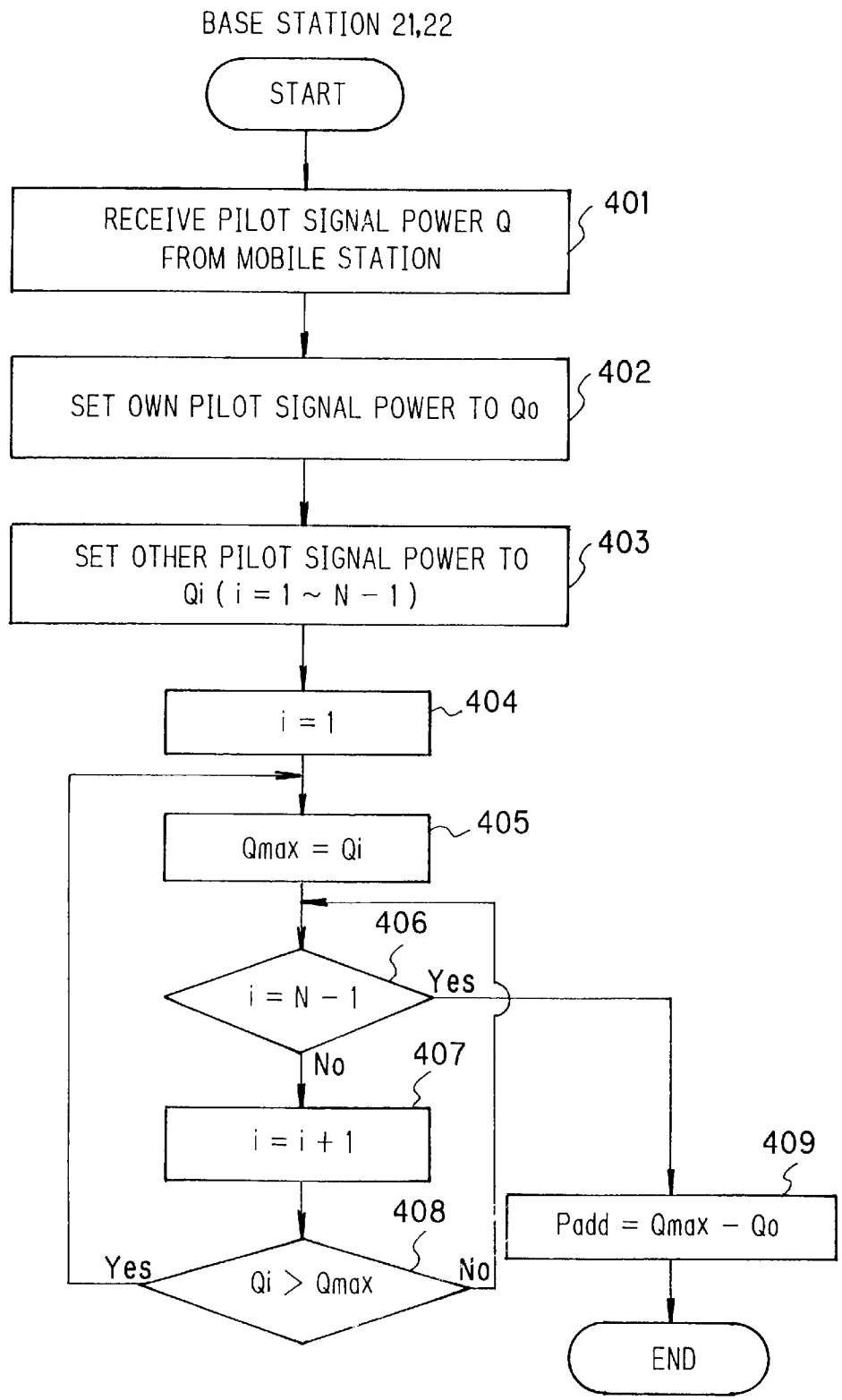
FIG. 4 is a flow chart illustrating a process of determining the transmission power level increase Padd in the third embodiment of the transmission power level control method.

FIG. 4 is a flow chart illustrating a process of determining the transmission power level increase Padd in the third embodiment of the transmission power level control method. Referring to FIG. 4, the determined process of the transmission power level increase Padd comprises a pilot signal received power level report receiving step 401, an own pilot signal received power level setting step 402, an other station pilot signal received power level setting step 403, a counter initializing step 404, a maximum received power level setting step 405, a counter judging step 406, a counter incrementing step 407, a received power level comparing step 408, and a transmission power level increase setting step 409.

The third embodiment of the transmission power level control method will now be described together with the operation of the cellular system.

In the third embodiment of the transmission power level control method, like the second embodiment of the transmission power level control method, the base stations 21 and 22 receive the reports on the primary and secondary base station pilot signal received power levels Q from the mobile stations 61 and 62 (step 401). The base stations 21 and 22 then set the own pilot signal received power level reported from the mobile stations 61 and 62 to $Q_0$ (step 402), while setting the other station pilot signal received power level to $Q_i$ (i=1, 2, ..., N−1, N being the sum of the numbers of the primary and secondary base station (step 403).

The base stations 21 and 22 then set a count i to "1" (step 404), and set the maximum pilot signal received power level $Q_{max}$ to $Q_i$ (step 405). When the count i is not equal to (N−1) (step 406), the base stations 21 and 22 add "1" to the count i (step 407). When the pilot signal received power level $Q_i$ is higher than the maximum level $Q_{max}$, the base stations 21 and 22 set the maximum level $Q_{max}$ to $Q_i$ (step 408). When the pilot signal received power level $Q_i$ is lower than the maximum level $Q_{max}$, the base stations 21 and 22 repeat the routine from the step 406. When it is found in the step 406 that the count i is equal to (N−1), the base stations 21 and 22 sets the transmission power level increase Padd to ($Q_{max-Q0}$) (step 409), and brings an end to the routine. In the above way, the maximum $Q_{max}$ of the pilot signal received power level $Q_i$ is retrieved, and the transmission power level increase Padd is set as Padd=$Q_{max}$−$Q_0$.

With the third embodiment of the transmission power level control method, it is possible to obtain the same effects as obtainable with the second embodiment of the transmission power level control method. In the third embodiment of the transmission power level control method, When the own pilot signal received power level $Q_0$ is not highest, dictating the sending of the up line transmission power level reduction control command to the mobile stations 61 and 62, the down line transmission power level P of the base station with the highest pilot signal received power level $Q_i$ is increased by an amount corresponding to the mount, by which the own pilot signal received power level $Q_0$ is lower, i.e., the transmission is higher. Thus, the measured result D of the desired wave power level in the mobile stations 61 and 62 is made the same as the up line transmission power level control command from the other base station. The down line transmission power level P is increased by an amount necessary for reducing the probability that the mobile stations 61 and 62 fail to receive the up line transmission power level reduction control command. It is thus possible to further reduce the down line interference wave power level increase.

A fourth embodiment of the transmission power level control method will now be described.

The cellular system adopting the fourth embodiment of the transmission power level control method, like the cellular system adopting the first embodiment of the transmission power level control method, has the construction as shown in FIG. 1.

Also, in the fourth embodiment of the transmission power level control method, like the first embodiment of the transmission power level control method, the base stations 21 and 22 send their pilot signals 31 and 32, the mobile stations 61 and 62 measure the center value of the received power level of the pilot signals 61 and 62, and the primary and secondary base stations are determined for each of the mobile stations 61 and 62 according to the result of measurement.

In this cellular system, the base stations 21 and 22 each have a measuring unit (not shown) for measuring the up line desired wave power level.

In the down line, the base stations 21 and 22 send the signal at a predetermined power transmission level P to the mobile stations 61 and 62 irrespective of whether the soft handover is being executed.

The base stations 21 and 22 which are the primary and secondary base stations of the mobile station 61 during the soft handover execution, measure the up line desired wave power level of the Mobile station 61 and report the result of measurement to a switching station 71.

Figure 5:
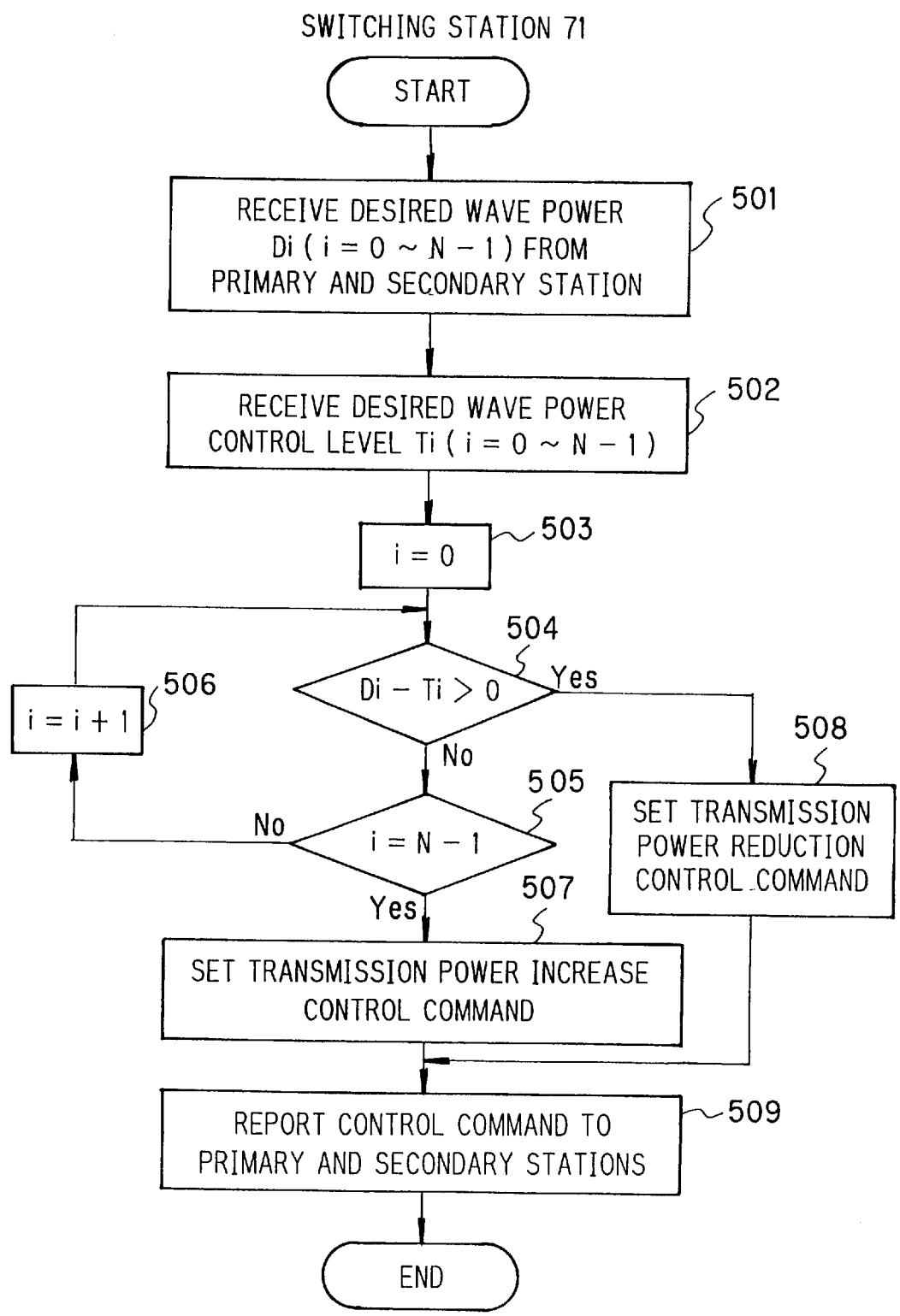
FIG. 5 is a flow chart illustrating a process, in which the switching station 71 determines the up line transmission power level control commands by receiving the desired wave power level measurement result report and reports the determined control command to the base stations 21 and 22.

FIG. 5 is a flow chart illustrating a process, in which the switching station 71 determines the up line transmission power level control commands by receiving the desired wave power level measurement result report and reports the determined control command to the base stations 21 and 22. Referring to FIG. 5, the up line transmission power level control command reporting process comprises a desired wave power level measurement result report receiving step 501, a desired control level report receiving step 502, a count initializing step 503, a measurement result/desired control level difference judging step 504, a count end judging step 505, a count incrementing step 506, a transmission power level increase control command setting step 507, a transmission power level reduction control command 508, and a control command reporting step 509.

The fourth embodiment of the transmission power level control method will now be described together with the operation of the cellular system.

The switching station 71 receives the reports of the desired wave power level measurement result $D_i$ (i=0, . . . , N−1) from the base stations 21 and 22 (step 501). The switching station 71 also receives the reports of the desired control level $T_i$ (i=0, . . . ,N−1) of the desired wave power level from the base stations 21 and 22 (step 502). The desired control level $T_i$ of the desired power level is fixed and common to the base stations 21 and 22.

The switching station 71 then sets the count i to "0" (step 503). Then, in a step 504 the switching station 71 checks the difference $(D_i-T_i)$ between the measurement result $D_i$ of the desired wave power level of an i-th base station and the desired control level $T_i$ of the desired wave power level. When $(D_i-T_i)$ is not greater than "0", the count i is compared to (N−1) (step 505). When the compared values are not equal, "1" is added to the count i (step 506), and the routine is repeated from the step 504. When it is found in the step 505 that the count i and (N−1) are equal, the switching station 71 makes the up line transmission power level control command to be a level increase command (step 507). When it is not found in the step 504 that $(D_i-T_i)$ is greater than "0", the switching station 71 makes the up line transmission power level control command to be a level reduction command (step 508). The switching station 71 reports the determined up line transmission power level control command to the primary and secondary base stations (step 509).

The base stations 21 and 22 report the up line transmission power level control command reported from the switching station 71 via the down line to the mobile stations 61 and 62, and the mobile stations 61 and 62 control the up line transmission power level according to the control command.

In the fourth embodiment of the transmission power level control method, the primary and secondary base stations send the same up line transmission power level control commands. Thus, when at least either one of the commands is received, the up line transmission power level can be controlled to the desired wave power level without possibility of excessive interference wave power with respect to either of the base stations 21 and 22 even with failure of reception of the other command. In this way, it is possible to increase the up line capacity.

In the fourth embodiment of the transmission power level control method, the down line transmission power level P is set to a fixed level. However, as described before in connection with the first embodiment of the transmission power level control method, the mobile stations 61 and 62 measure the frame error rate, and the base stations 212 and 22 receive the reports of the measurement and control the down line transmission power level according to the report.

A fifth embodiment of the transmission power level control method will be described.

The cellular system adopting the fifth embodiment of the transmission power level control method, like the cellular system adopting the first embodiment of the transmission Power level control method, has the same construction as shown in FIG. 1.

Also, like the cellular system adopting the first embodiment of the transmission power level control method, the base stations 21 and 22 send the pilot signals 31 and 32, the mobile stations 61 and 62 measure the center value of the received power level of the pilot signals 31 and 32, and the primary and secondary base stations are determined for communication with each of the mobile stations 61 and 62 according to the result of measurement.

In the cellular system adopting the fifth embodiment of the transmission power level control method, the base stations 21 and 22 each have a measuring unit (not shown) for measuring the up line desired wave power level.

In the down line, the base stations 21 and 22 send signal at a down line transmission power level P to the mobile stations 61 and 62 irrespective of whether the soft handover is being executed.

When the difference $(D_i-T_i)$ between the desired wave power level measurement result $D_i$ and the desired control level $T_i$ of the desired wave power is greater than "0", the base stations 21 and 22 each set a level reduction command as a tentative transmission power level control signal. When the difference $(D_i-T_i)$ is less than "0", the base stations set a level increase command as the tentative control command. The tentative control commands are reported to the switching station 71.

Figure 6:
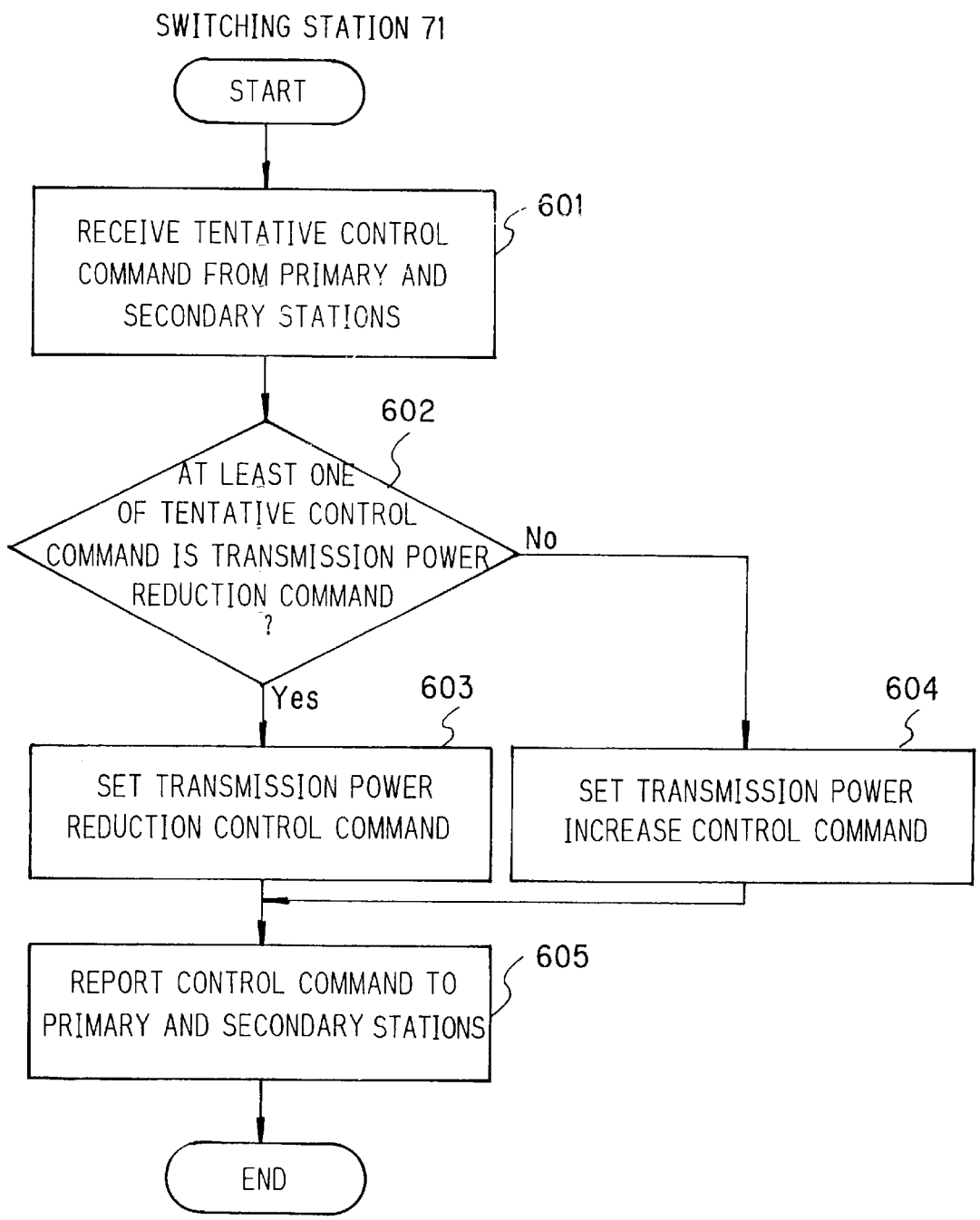
FIG. 6 is a flow chart illustrating a process, in which the switching station 71 determines the up line transmission power level control command by receiving the reports of tentative control commands from the base stations 21 and 22 and reporting the command to the base stations 21 and 22.

FIG. 6 is a flow chart illustrating a process, in which the switching station 71 determines the up line transmission power level control command by receiving the reports of tentative control commands from the base stations 21 and 22 and reporting the command to the base stations 21 and 22. Referring to FIG. 6, the up line transmission power level control command reporting process comprises a tentative control command report receiving step 601, a transmission power level reduction judging step 602, a transmission power level reduction control command setting step 603, a transmission power level increase control command setting step 604, and a control command reporting step 605.

The fifth embodiment of the transmission power level control method will now be described together with the operation of the cellular system.

The switching station 71 receives reports of the tentative control commands from the primary and secondary base stations (step 601). Then, when it is found in the step 602 that at least one of the tentative control commands is a level reduction command, the switching station 71 determines the up line transmission power level control command to be a level reduction command (step 603). When all the tentative control commands are level increase commands, the switching station 71 determines the up line transmission power level control command to be a level increase command (step 604). The switching station 71 reports the determined up line transmission power level control command to the base stations 21 and 22 as the primary and secondary base stations, respectively (step 605).

The base stations 21 and 22 report the up line transmission power level control command reported from the switching station 71 via the down line to the base stations 61 and 62, and the mobile stations 61 and 62 control the up line transmission power level according to the control command.

In the fifth embodiment of the transmission power level control method, the primary and secondary base stations send the same up line transmission power level control command. Thus, when at least either one of the commands is received, the up line transmission power level can be controlled to the desired wave power level without possibility of excessive interference wave power with respect to either of the base stations 21 and 22 even with failure of reception of other commands. In this way, it is possible to increase the up line capacity.

A sixth embodiment of the transmission power level control method will now be described.

The cellular system adopting the sixth embodiment of the transmission power level control method, like the first embodiment of the transmission power level control method, has the construction shown in FIG. 1.

Also, like the first embodiment of the transmission power level control method, the base stations 21 and 22 send their pilot signals 31 and 32, and the mobile stations 61 and 62 measure the center value of the received power level of the pilot signals and determine the primary and secondary base stations for communication with respect to each of the mobile stations 61 and 62 according to the result of measurement.

In the cellular system adopting the sixth embodiment of the transmission power level control method, the base stations 21 and 22 each have a measuring unit (not shown) for measuring the up line desired wave power level.

In the down line, the base stations 21 and 22 send the communication signal at a predetermined down line transmission power level P to the mobile stations 61 and 62 irrespective of whether soft handover is being executed.

The base stations 21 and 22 as the primary and secondary base stations, respectively, of the mobile station 61 executing the handover, measure the up line desired wave power level of the mobile station 61 and report the result of measurement to the switching station 71.

The switching station 71 receives the reports of the desired wave power level measurement result Di and determines the up line transmission power level and reports the determined command to the base stations 21 and 22.

The mobile station 61 measures the received power levels Q of the pilot signals 31 and 32 sent from the base stations 21 and 22 as the primary and secondary base stations, and reports both the measured received power levels Q to each of the base stations 21 and 22.

Figure 10:
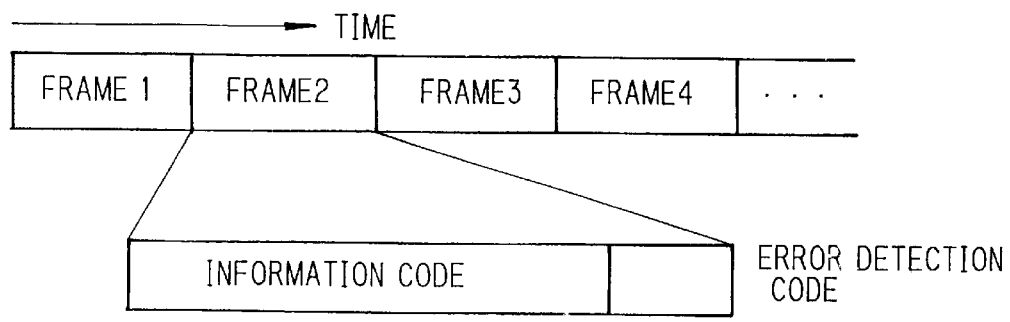
FIG. 10 is an example of frame structure for transmitting/receiving the information between the base station and the mobile station in the cellar system in FIG. 1.

The time spent for the measurement of the received power levels Q of the pilot signals is set to be shorter than the time spent for measuring the center value of each of these received power levels of the pilot signals. The interval of reporting the result of measurement is set to be shorter than the interval of updating the primary and secondary base stations. In the sixth embodiment of the transmission power level control method, like the second embodiment of the transmission power level control method, the pilot signal measurement frame shown in FIG. 6 and the transmission/reception frame shown in FIG. 10, are the same in length, and the mobile stations 61 and 62 measure the received power levels Q of the pilot signals of the base stations 21 and 22 once in each frame shown in FIG. 8 and report the result of measurement to the base stations 21 and 22 for each transmission/reception frame of the mobile stations 61 and 62. This means that the received power level Q of the pilot signal from the primary base station measured for each frame may not be highest.

Figure 7:
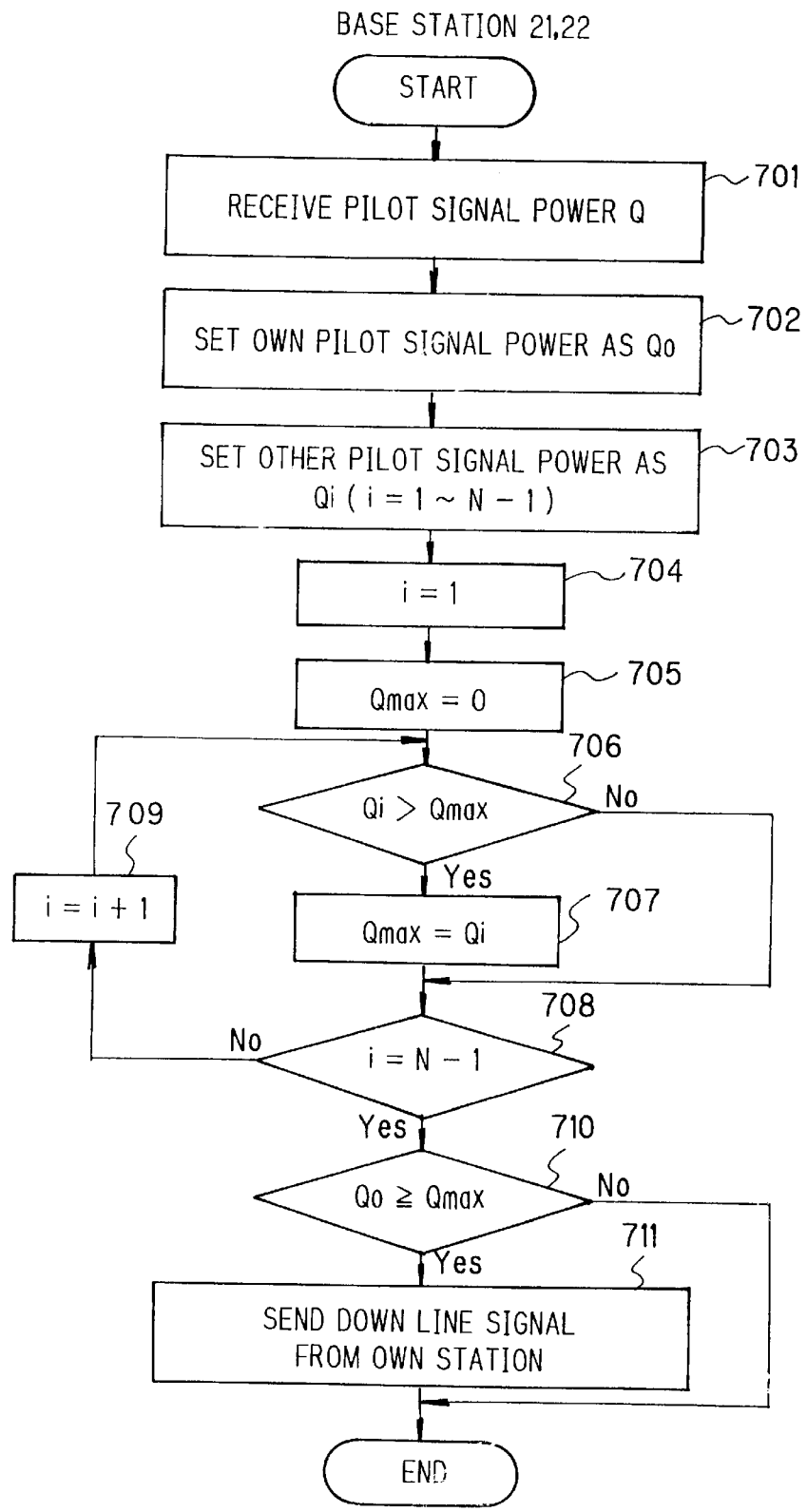
FIG. 7 is a flow chart illustrating a process, in which the base stations 21 and 22 determine whether they send signal during the soft handover execution.

FIG. 7 is a flow chart illustrating a process, in which the base stations 21 and 22 determine whether they send signal during the soft handover execution. Referring to FIG. 7, the process of determining the signal sending during the soft handover execution, comprises a pilot signal received power level report receiving step 701, an own pilot signal received power level setting step 702, an other station pilot signal received power level setting step 703, a count initializing step 704, a maximum received power level setting step 705, a received power level comparing step 706, a maximum received power level setting step 707, a count judging step 708, a count incrementing step 709, a received power level comparing step 710, and a down line signal sending step 711.

The sixth embodiment of the transmission power level control method will now be described together with the operation of the cellular system.

In the sixth embodiment of the transmission power level control method, like the third embodiment of the transmission power level control method, the base stations 21 and 22 receive the reports of the received power levels Q of the pilot signals of the primary and secondary base stations from the mobile stations 61 and 62 (step 701). Then, the base stations 21 and 22 set the own pilot signal received power level reported from the mobile stations 61 and 62 to $Q_0$ (step 702) and other station pilot signal received power level to $Q_i$ (i=1, . . . ,N−1, N being the sum of the numbers of the primary and secondary base stations) (step 703).

The base stations 21 and 22 then set the counter i to "1" and set the maximum pilot signal received power level $Q_{max}$ to "0" (step 705). When it is found in a step 706 that the pilot signal received power level $Q_i$ is higher the maximum level $Q_{max}$, the base stations 21 and 22 set the maximum level $Q_{max}$ to $Q_i$ (step 707), and compares the count i and (N−1). When the two are not equal, the base stations 21 and 22 add count 1 to "1" (step 709). The routine is then repeated from the step 706. When it is found in the step 706 that the pilot signal received power level $Q_i$ is lower than the maximum level $Q_{max}$, the base stations 21 and 22 execute a step 708.

When it is found in the step 708 that the count i is equal to (N−1), the base stations 21 and 22 execute a step 710 of comparing the maximum level $Q_{max}$ with the own pilot signal received power level $Q_0$. When the own pilot signal received power level $Q_0$ is higher than the maximum level $Q_{max}$, the own station sends down line signals 41a, 41b and 42 (step 711). When it is found in the step 710 that the own pilot signal received power level $Q_0$ is lower than the maximum level $Q_{max}$, the other base station sends signals, while the own station does not.

As shown, during soft handover execution the base stations 21 and 22 receive reports of the received power levels Q of the pilot signals of the primary and secondary base stations from the mobile stations 61 and 62, and when the own pilot signal received power level Q is highest, they report the up line transmission power level control command reported form the switching station 71 via the down line to the mobile stations 61 and 62 to let the mobile stations 61 and 62 to control the up Line transmission power level according to the up line transmission power level control command.

With the sixth embodiment of the transmission power level control method, even when adopted by a cellular system in which only either one of the primary and secondary base stations send down line signal according to the pilot signal received power levels Q in the mobile stations 61 and 62, and the up line transmission power level can be controlled to the desired wave power level without possibility of excessive interference wave power with respect to either of the base stations 21 and 22 even with failure of reception of the other commands, thus permitting the up line capacity to be increased.

In all the above embodiments, the desired control value in the up line transmission power level control need neither be common to all the base stations nor be fixed, that is, it is possible to control the desired control value according to the interference wave power levels in the base stations. For the up line transmission power level control, it is also possible that the base stations measure the ratio between the desired wave power level and the interference wave power level instead of measuring the desired wave power level and determine the transmission power level control command to the mobile stations such that the power level ratio between the desired and interference waves is a constant.

As has been described in the foregoing, according to the present invention it is possible to prevent mobile stations from making transmission via the up line at an excessive transmission power level and permit increasing the up line capacity during the handover execution in any of the cases when adopting the transmission power level control method of making the transmission power levels in the base stations to be equal, when no down line transmission power level control is made and when only a single base station transmits signal via the down line.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A transmission power level control method for a cellular system involving a plurality of cells, base stations each located in each of the cells, and a plurality of mobile stations present in the mobile stations each being able to have a line or lines set for communication with one or a plurality of the base stations, wherein when one of the base stations sends a down line control command to a mobile station for reducing the transmission power level of the mobile station, the transmission power level of the down line signal sent by the base station is increased with respect to the transmission power level when the base station sends a down line control command to the mobile station for increasing the transmission power level of the mobile station.

2. The transmission power level control method according to claim 1, wherein a base station sends down line transmissions to a mobile station to command the mobile station to send up line transmissions to the base station with an increased transmission power level or with a reduced transmission power level, and sends a down line transmission with an increased transmission power level to the mobile station to command the mobile to send an up line transmission with a reduced transmission power level, to reduce the probability of failure of receipt by the mobile unit of the transmission power level reduction control command.

3. The transmission power level control method according to claim 1, wherein the base stations each send a pilot signal, one of the mobile stations with lines set with respect to a plurality of the base stations measures the reception qualities of the pilot signals of the plurality of base stations, and reports all of the measured reception qualities of the pilot signals to the plurality of base stations, and when one of the base stations sends a down line control command to the one mobile station for reducing the transmission power level and the reception quality of the pilot signal of the one base station is not highest among the reception qualities of the pilot signals of the plurality of base stations, the one base station increases the transmission power level of the down line power level reduction control command sent to the one mobile station.

4. The transmission power level control method according to claim 3, wherein the transmission power level of the down line power level reduction control command sent by the one base station is increased by an amount corresponding to the ratio between the highest received power level of the pilot signals of the plurality of base stations and the received power level of the pilot signal of the one base station.

5. The transmission power level control method according to claim 1, wherein when one of the mobile stations has lines set with respect to a plurality of the base stations, the plurality of base stations each measure the reception quality of a signal transmitted from the one mobile station, determine a control command for controlling the transmission power level of signals transmitted by the one mobile station, and send the control command to the one mobile station, and the one mobile station receives the control commands from the plurality of base stations and controls the transmission power level according to a control command for reducing the transmission power level.

6. A transmission power level control method for a cellular system involving a plurality of cells, base stations each located in each of the cells, a control station communicating with the base stations, and mobile stations present in the cells, the mobile stations being able to have a line or lines set for communication with one or a plurality of the base stations, wherein:

when one of the mobile stations has lines set with respect to a plurality of the base stations, the plurality of base stations each measure the reception quality of a received signal transmitted from the one mobile base station, the control station determines a control command for controlling the transmission power level of up line signals transmitted by the one mobile station, and the plurality of base stations send the determined control command to the one mobile station, and the mobile station receives the control command and controls the transmission power level of up line signals on the basis of the received control command.

7. The transmission power level control method according to claim 6, wherein the control station determines the control signal for controlling the transmission power level of signals transmitted by the one mobile station on the basis of the measurement results in the plurality of base stations, the base stations each determine a tentative control command for controlling the transmission power level of signals transmitted by the one mobile station, and the control station determines and selects one of the tentative control commands that minimizes the transmission power level of signals transmitted by the one mobile station.

8. The transmission power level control method according to claim 6, wherein the base stations each send a pilot signal, and when one of the mobile stations has lines set with respect to a plurality of the base stations, the one mobile station measures the reception qualities of the pilot signals of the plurality of base stations and reports all of the reception qualities to the plurality of base stations, and only the base station measured as having the highest reception quality pilot signal sends the determined control signal to the mobile station.

9. A transmission power level control method for a cellular system involving a plurality of cells, base stations each located in each of the cells, and a plurality of mobile stations present in the cells, the mobile stations each being able to have a line or lines set for communication with one or a plurality of the base stations, wherein a base station sends a down line control command to a mobile station with increased transmission power when the receipt quality of the transmission signal of the mobile station exceeds a predetermined level.

* * * * *

UNITED STATES PATENT AND TRADEMARK OFFICE
CERTIFICATE OF CORRECTION

PATENT NO.    : 6,070,084
DATED         : October 2, 2000
INVENTOR(S)   : Kojiro Hamabe It is certified that error appears in the above-identified patent and that said Letters Patent is hereby corrected as shown below:

<u>Title page,</u>
Item [54], "CELLULAR SYSTEM" should read -- METHOD FOR CONTROLLING AND MINIMIZING TRANSMISSION POWER IN A CDMA CELLULAR MOBILE TELEPHONE SYSTEM --

<u>Column 15,</u>
Line 57, "the mobile" should read -- the cells, the mobile --

Signed and Sealed this

Twenty-fourth Day of September, 2002

Attest:

Attesting Officer

JAMES E. ROGAN
*Director of the United States Patent and Trademark Office*